(12) United States Patent
Kachalia et al.

(10) Patent No.: US 11,102,167 B2
(45) Date of Patent: *Aug. 24, 2021

(54) SYSTEMS AND METHODS FOR MULTICAST DOMAIN NAME SYSTEM REDUNDANT QUERY SUPPRESSION

(71) Applicant: Cisco Technology, Inc., San Jose, CA (US)

(72) Inventors: Rahul Kachalia, Cary, NC (US); Saiprasad Muchala, Bangalore (IN); Sundararaju Veeraiah, Bangalore (IN); Saurabh Agarwal, Santa Clara, CA (US); Manoj Narayan, Fremont, CA (US); Ankur Bhargava, Pleasanton, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/865,160

(22) Filed: May 1, 2020

(65) Prior Publication Data

US 2020/0259782 A1 Aug. 13, 2020

Related U.S. Application Data

(63) Continuation of application No. 15/838,512, filed on Dec. 12, 2017, now Pat. No. 10,652,200.

(51) Int. Cl.
*H04L 29/12* (2006.01)
*H04L 12/24* (2006.01)
*G06F 16/903* (2019.01)

(52) U.S. Cl.
CPC .... *H04L 61/1511* (2013.01); *G06F 16/90348* (2019.01); *H04L 41/0604* (2013.01);
(Continued)

(58) Field of Classification Search
CPC ..... H04L 61/1511; H04L 41/08; H04L 61/15; H04L 61/2069; H04L 61/6059; G06F 16/90348
See application file for complete search history.

(56) References Cited

U.S. PATENT DOCUMENTS 7,379,846 B1 * 5/2008 Williams .............. G06F 11/079
702/183
2003/0182269 A1 * 9/2003 Cheshire ........... H04L 29/12132
(Continued)

FOREIGN PATENT DOCUMENTS

JP 2017-179673 9/2017

OTHER PUBLICATIONS

English Translation (machine) of Japanese Patent Application JP-2017-179673 filed in Japan on Sep. 2018 by Masaaki Aiba. (Year: 2018).

*Primary Examiner* — Philip J Chea
*Assistant Examiner* — Hassan A Khan
(74) *Attorney, Agent, or Firm* — Polsinelli PC

(57) ABSTRACT

Systems, methods, and computer-readable media for implementing local and wide network suppression of query requests in zero-configuration networking. Disclosed are systems, methods, and computer-readable storage media for implementing suppression of query packets zero-configuration networking over local and wide networks by utilizing agents, application programming interfaces (API), and a controller. The suppression can be determined based on two time periods, a processing period and a suppression period.

18 Claims, 9 Drawing Sheets

(52) U.S. Cl.
CPC .............. *H04L 41/08* (2013.01); *H04L 61/15* (2013.01); *H04L 61/1541* (2013.01); *H04L 61/2069* (2013.01); *H04L 61/6059* (2013.01)

(56) References Cited

U.S. PATENT DOCUMENTS

| | | | |
|---|---|---|---|
| 2013/0159496 A1* | 6/2013 | Hamilton | H04L 41/5067 709/224 |
| 2014/0214958 A1* | 7/2014 | Cheshire | H04L 61/1511 709/204 |
| 2014/0365663 A1* | 12/2014 | Arnold | H04L 29/08153 709/226 |
| 2014/0372567 A1* | 12/2014 | Ganesh | H04L 67/1002 709/219 |
| 2015/0100700 A1* | 4/2015 | Ishvarchandra | H04L 61/10 709/228 |
| 2015/0120951 A1* | 4/2015 | Wilson | H04L 43/08 709/229 |
| 2016/0315781 A1* | 10/2016 | Dronadula | H04L 12/189 |
| 2017/0078408 A1* | 3/2017 | Lepp | H04L 67/42 |
| 2019/0089672 A1* | 3/2019 | Aiba | H04L 61/2069 |

* cited by examiner

SYSTEMS AND METHODS FOR MULTICAST DOMAIN NAME SYSTEM REDUNDANT QUERY SUPPRESSION

CROSS-REFERENCE TO RELATED APPLICATION

The instant application is a Continuation of, and claims priority to, U.S. patent application Ser. No. 15/838,512 entitled SYSTEMS AND METHODS FOR MULTICAST DOMAIN NAME SYSTEM REDUNDANT QUERY SUPPRESSION filed Dec. 12, 2017, the contents of which are herein incorporated by reference in its entirety.

TECHNICAL FIELD

The present technology pertains to wide area multicast domain name systems in zero-configuration networking and more specifically to redundant query request message suppression in a local area and wide area multicast domain name system.

BACKGROUND

Zero-configuration networking automatically creates a usable computer network between networked devices (e.g., computers, printers, peripherals, etc.) based on the Transmission Control Protocol and Internet Protocol (TCP/IP). Zero-configuration networking includes service discovery, address assignment and hostname resolution. The networked devices can be automatically connected using multicast Domain Name Systems (mDNS) over wide area networks.

A Service Discovery Gateway (SDG) can listen, process and response to each incoming mDNS Query request message from the networked devices. One-to-one mDNS Query response can operate in similar fashion to unicast application, even when Query response is a link-local mDNS packet. The networked devices promiscuously listen mDNS Announcements (the response to the query from the SDG) and send a Query message with "Known Answer" to check new source in local domain. Redundant mDNS Query response message consisting of the same or different service records can significantly degrade SDG performance in large-scale networks. Moreover, duplicate mDNS Query response messages may impact LAN/WLAN network bandwidth and network device performance for the service pointer queries.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
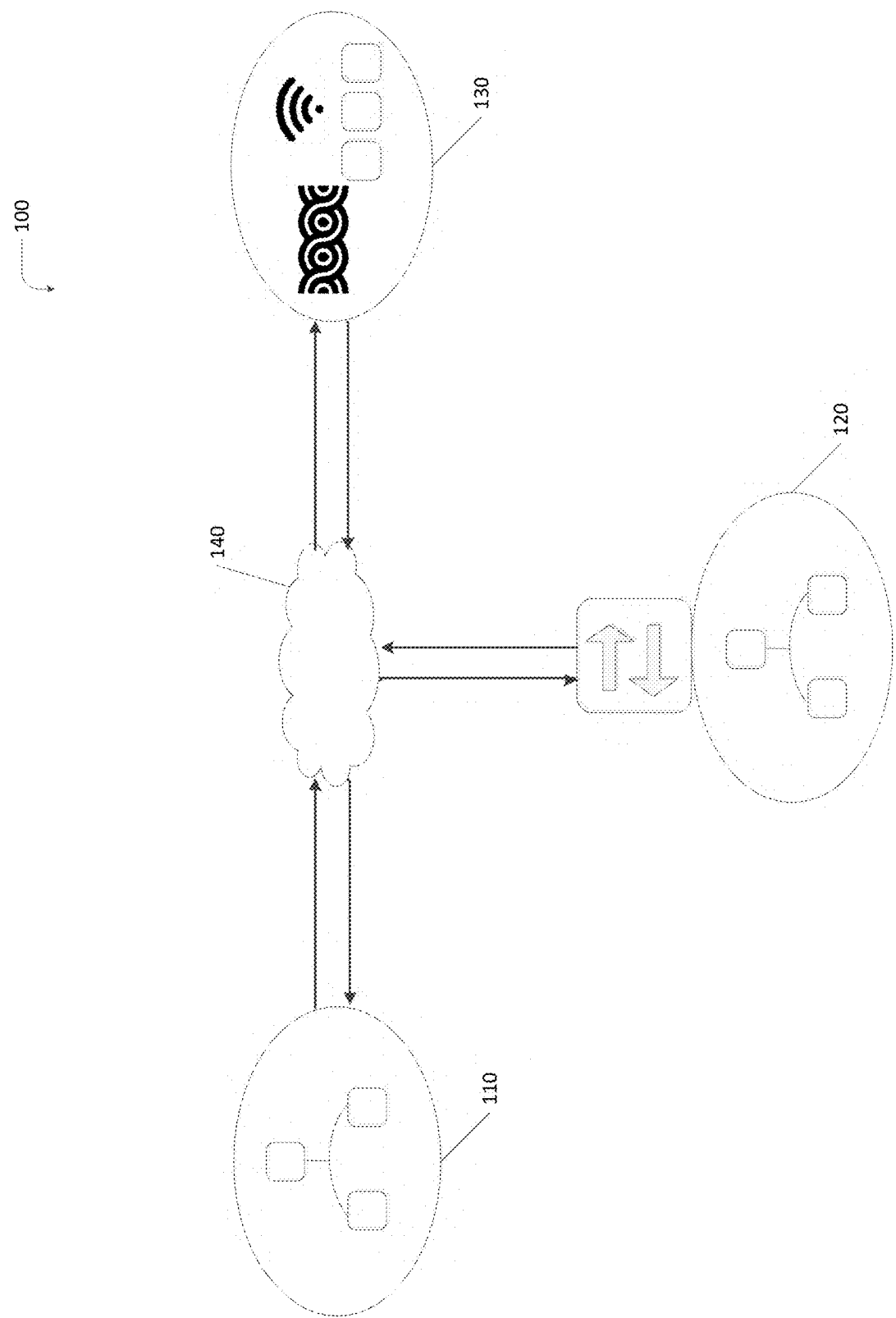
FIG. 1 illustrates a diagram of an example communication network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to implement suppression, on a per tuple basis, of query requests and responses in a zero configuration network. Disclosed are systems, methods, and computer-readable storage media for suppressing query messages. The systems, methods, and computer-readable storage media including a gateway device for receiving a multi domain name service (mDNS) message, wherein the mDNS message includes a tuple of at least a service type, IPv4 address and IPv6 address. The gateway device can determine whether the mDNS message is a query request and in response to determining the mDNS message is a query request, determining whether the message is a multicast request. In response to the gateway device determining the mDNS message is not a query message, the gateway device can ignore suppression of the incoming mDNS message and process further independently. The gateway device can also determine whether the mDNS message is a multicast request, and in response to determining the mDNS message is a multicast request, the gateway device can determine a message type. In response to the gateway device determining the mDNS message is not a multicast request, the gateway device can ignore suppression of the mDNS message. The gateway device can determine the message type is an any message and ignore suppressing of the mDNS message. The gateway device can determine the message type is a standard message type, and in response to determining the message type is the standard message type, the gateway device can determine whether the mDNS message is in a suppression period. In response to the mDNS message being in the suppression period, suppress the mDNS message. The gateway device can also determine the mDNS is in a processing period and not the suppression period. In response to determining the mDNS is in the processing period, the gateway device can determine whether the tuple is redundant and can suppress the mDNS message or that the tuple is new and process the mDNS message.

Description

Figure 2:
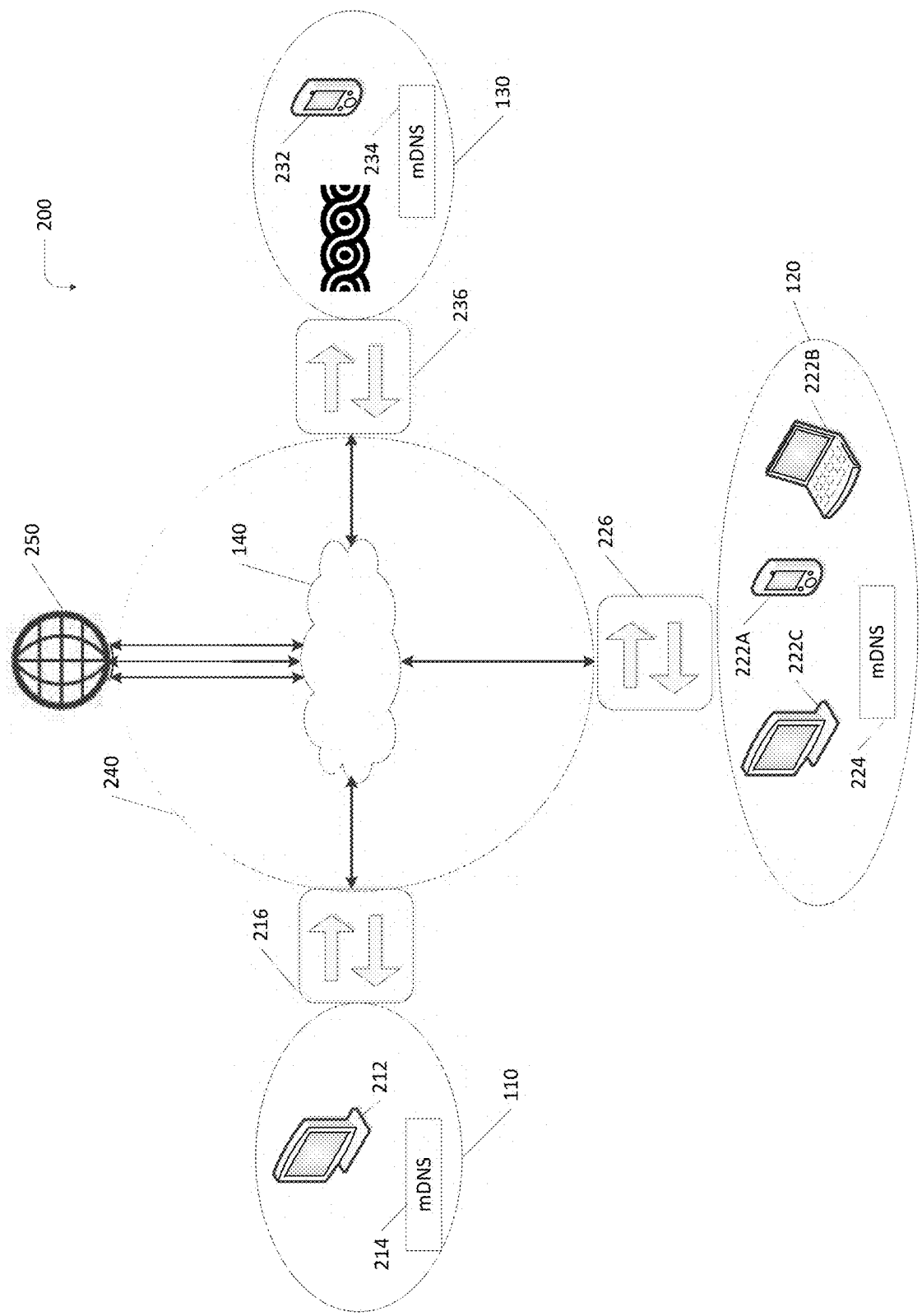
FIG. 2 illustrates a diagram of an example network architecture of a data center.
Figure 3:
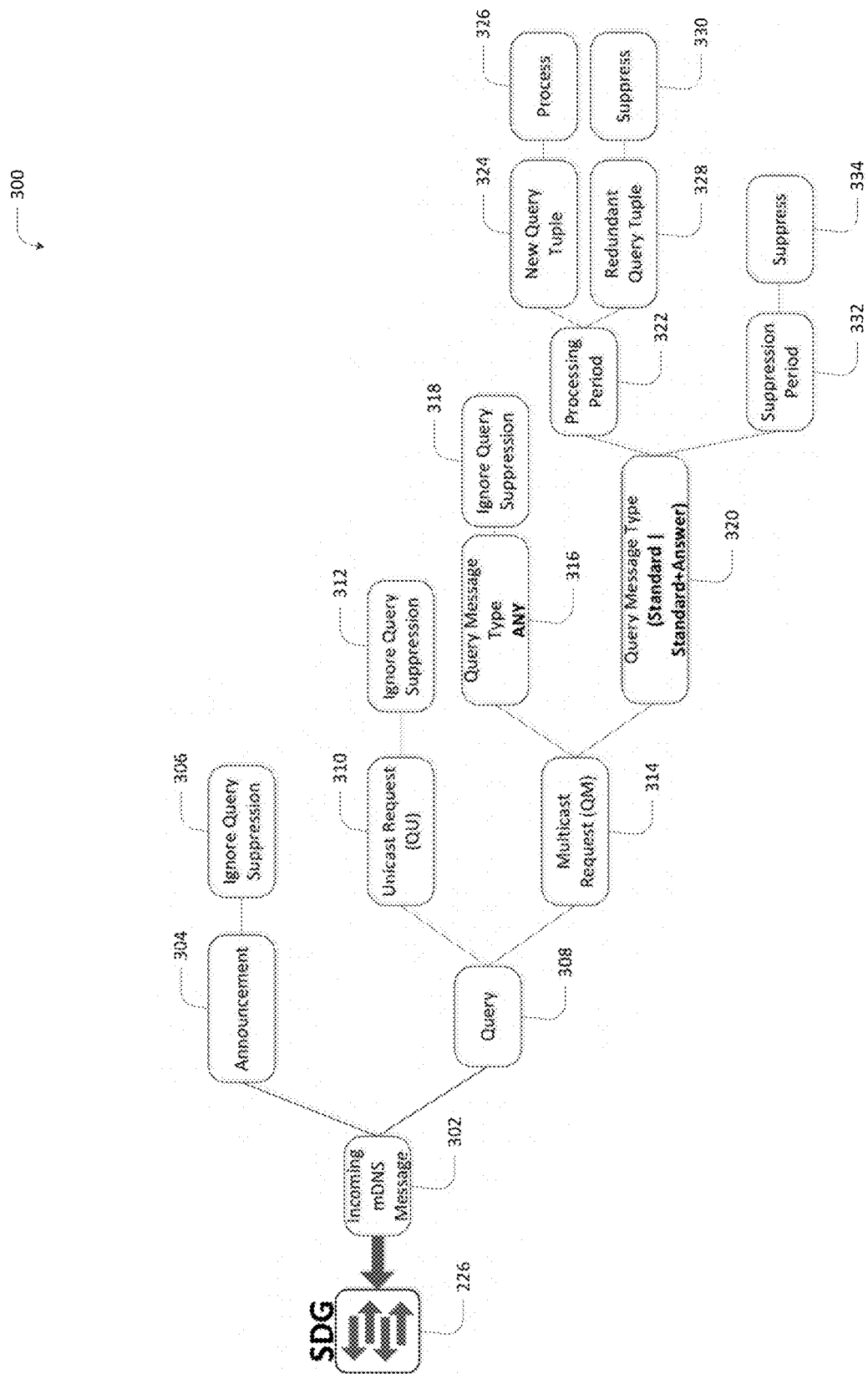
FIG. 3 illustrates a flow diagram of example local network query request suppression.
Figure 4:
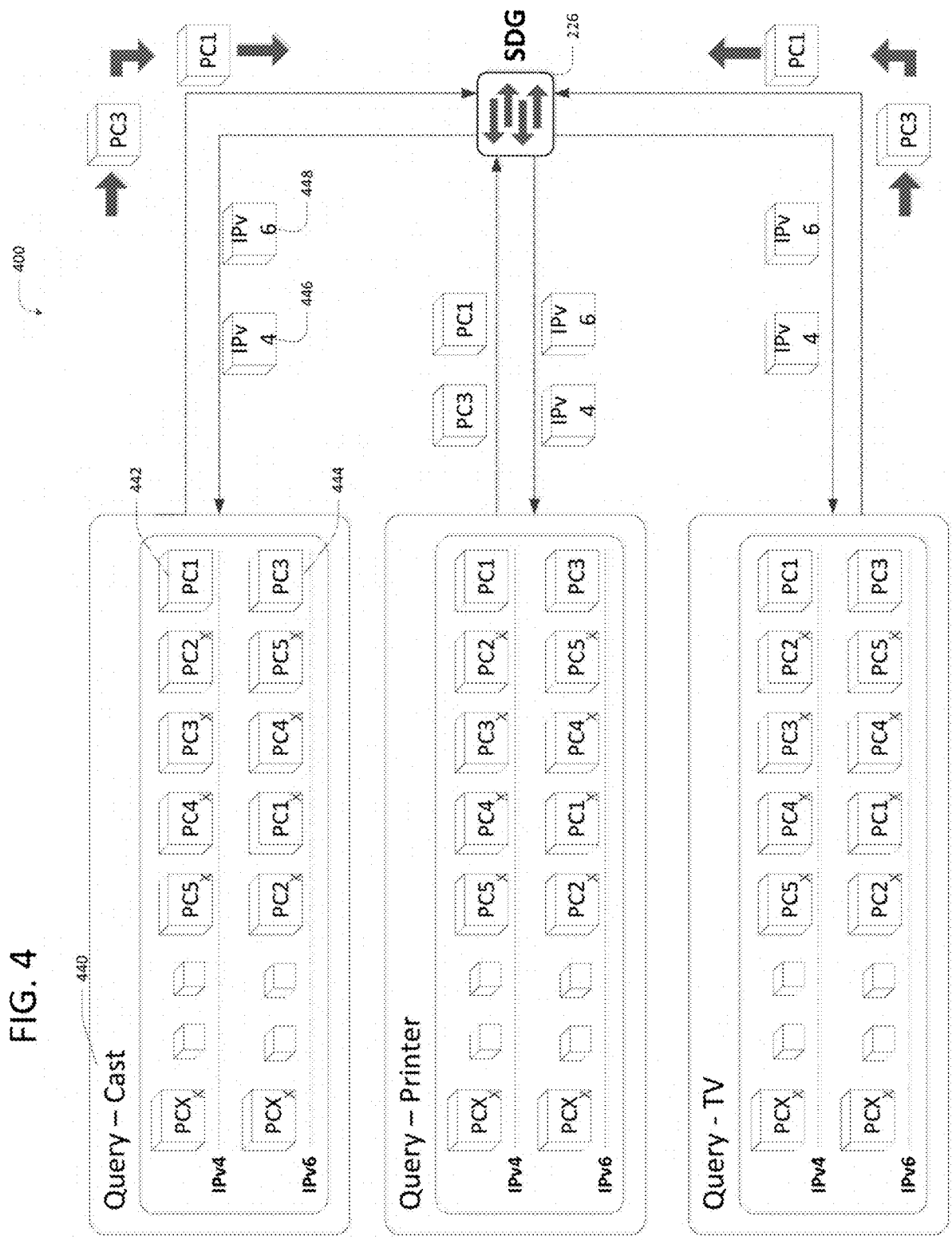
FIG. 4 illustrates a diagram of an example processing period in a local network.
Figure 5:
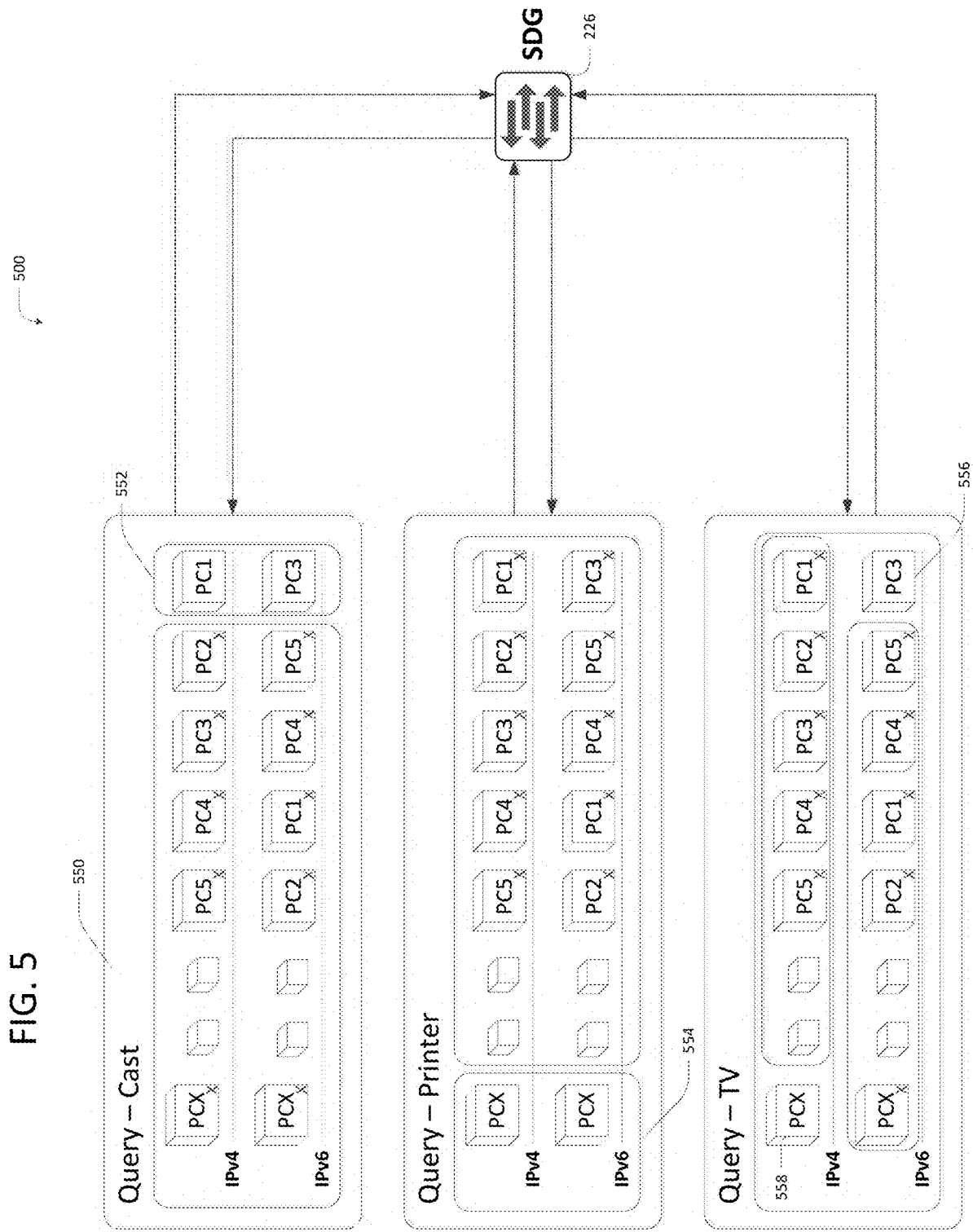
FIG. 5 illustrates a diagram of an example suppression period in a local network.
Figure 6:
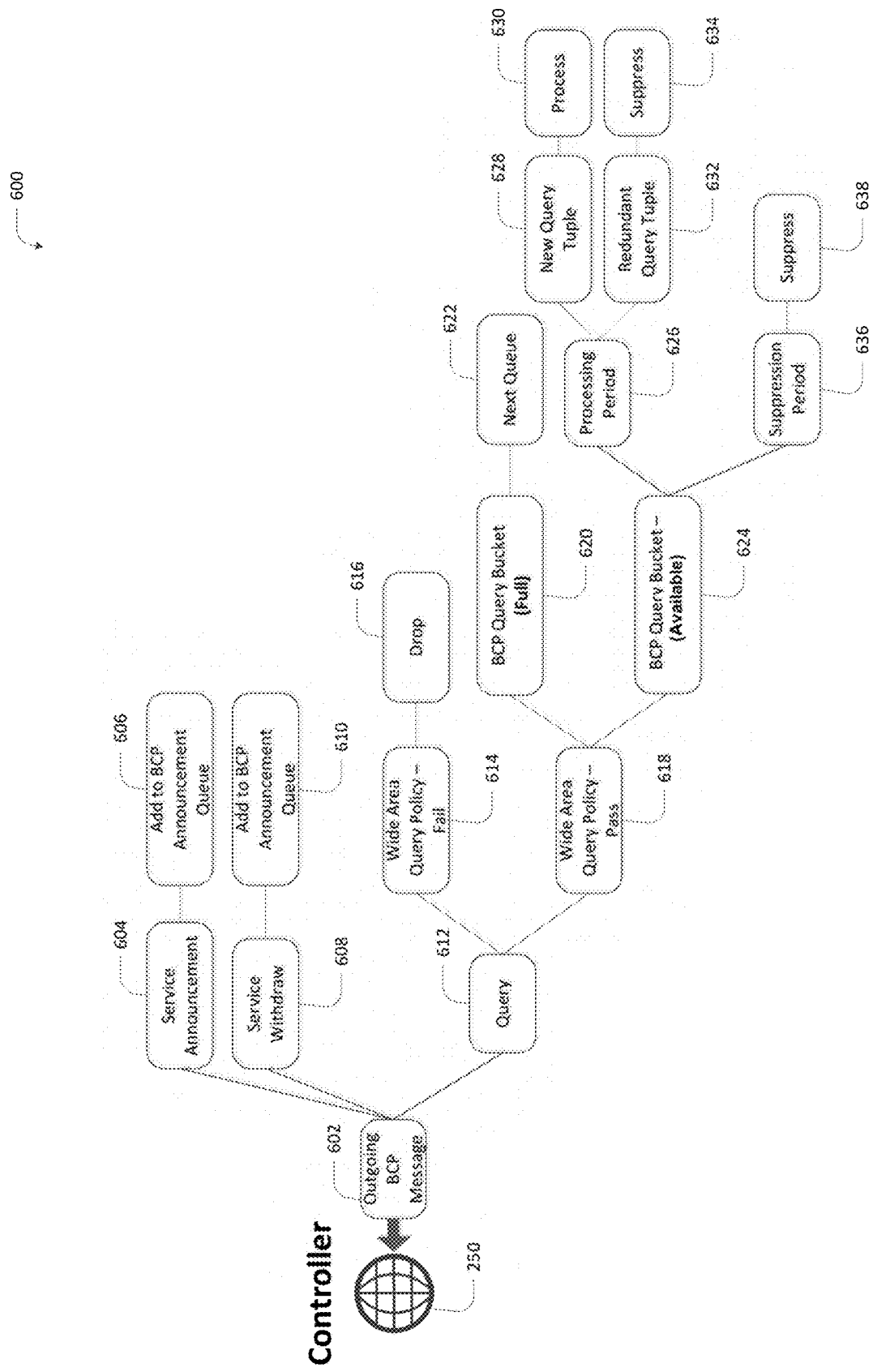
FIG. 6 illustrates a flow diagram of example wide network query request suppression.
Figure 7:
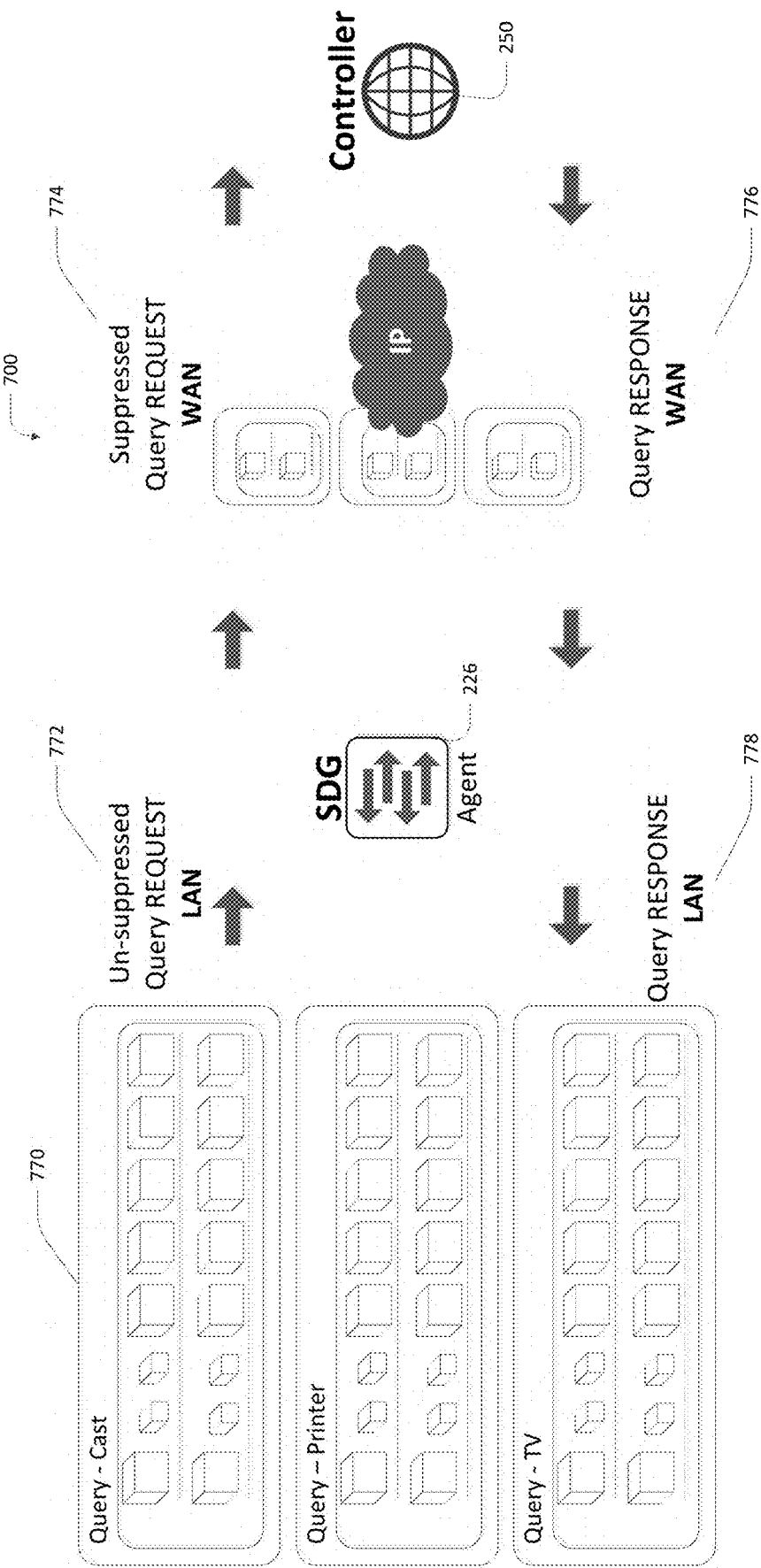
FIG. 7 illustrates a diagram of an example suppression in a wide network.
Figure 8:
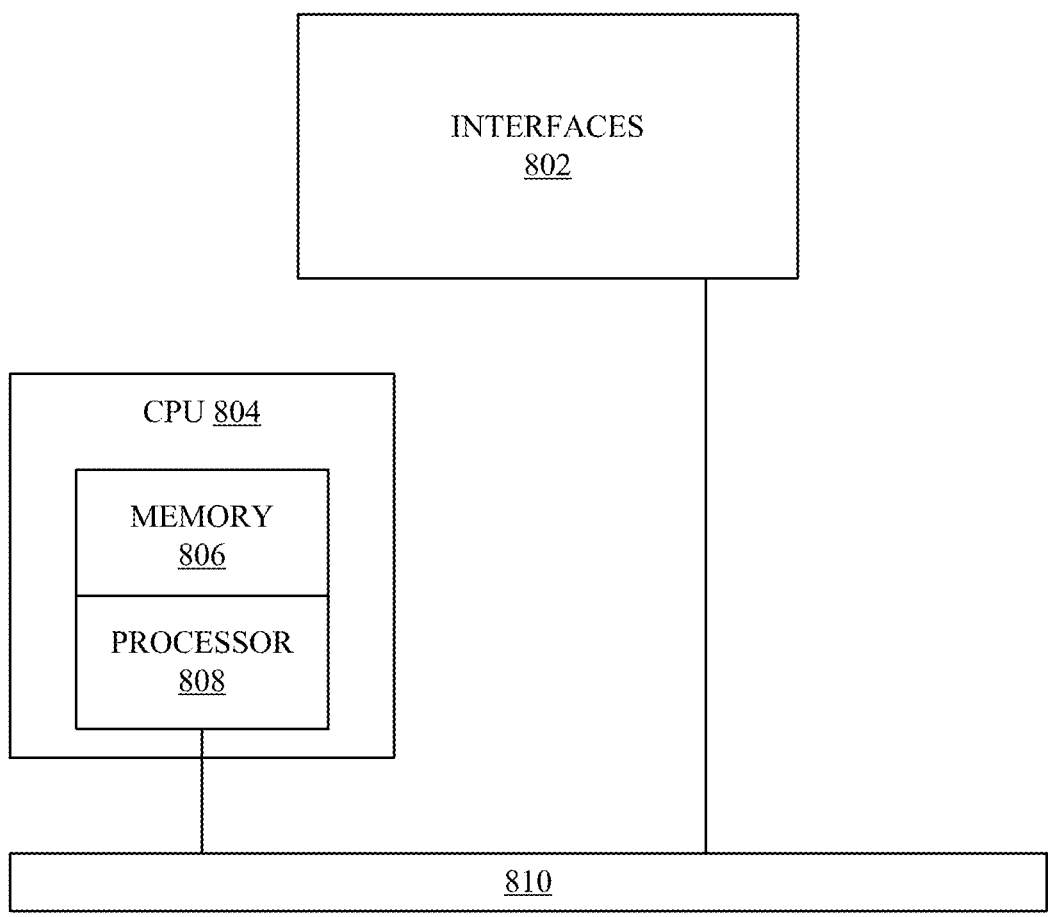
FIG. 8 illustrates an example network device.
Figure 9:
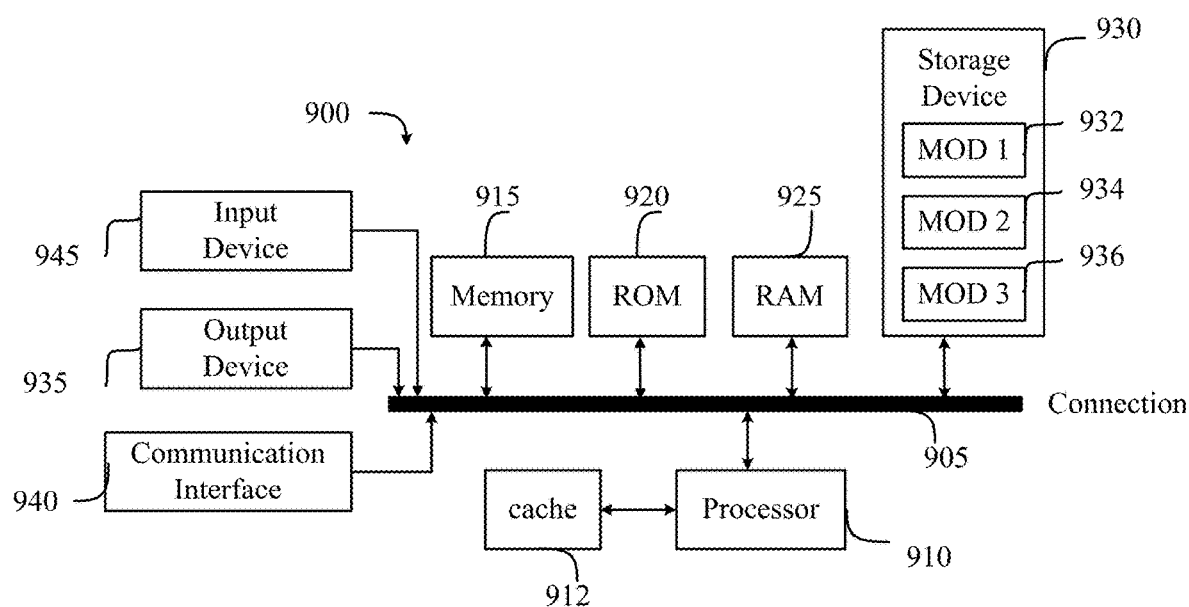
FIG. 9 illustrates example system embodiments.

The disclosed technology addresses the need in the art for implementing suppression, on a per tuple basis, of query requests and responses in a zero configuration network. Disclosed are systems, methods, and computer-readable storage media for implementing suppression, on a per tuple basis, of query requests and responses in a zero configuration network by utilizing agents, application programming interfaces (API), a controller and processing and suppression periods. A description of network computing environments and architectures, as illustrated in FIGS. 1-2, is first disclosed herein. A discussion of local network query request suppression as illustrated in FIGS. 3-5 will then follow. A discussion of wide network query request suppression as illustrated in FIGS. 6-7 will then follow. The discussion then concludes with a description of example devices, as illustrated in FIGS. 8 and 9. These variations shall be described herein as the various embodiments are set forth. The disclosure now turns to FIG. 1.

FIG. 1 is a schematic block diagram of a communication network 100 illustratively including networks 110, 120 and 130. In FIG. 1, networks 110, 120 and 130 are unable to automatically configure communication between devices using a zero-configuration networking.

FIG. 2 is a schematic block diagram of an example communication network 200 illustratively including networks 110, 120 and 130. Each network (e.g., 110, 120, 130, etc.) can have one or more devices 212, 222 (e.g., 222A, 222B, 222C, etc.), 232 (e.g., servers, computing devices, printers, smart phones, networked components, televisions, endpoints, etc.). Each network (e.g., 110, 120, 130, etc.) can run zero-configuration services, including, but not limited to multicast Domain Name System 214, 224, 234 (mDNS). Each network can also be local area service discovery gateways (SDG). mDNS (e.g., 214, 224, 234, etc.) can resolve host names to IP addresses within small networks that do not include a local name server. Each mDNS of a local area network works with the agents to announce, advertise and query for services that exist beyond the local area network.

Each network (e.g., 110, 120, 130, etc.) can also run one or more zero-configuration Agents 216, 226, 236. The one or more agents (e.g., 216, 226, 236) can run on one or more gateway devices (not shown) and can communicate (e.g., wired, wireless, etc.) with zero configuration controller 250 over wide area network 140 (e.g., the Internet, etc.) through wide area service SDG 240. In some examples, the agents can communicate with the networked devices and the controller using one or more APIs. The agents can be configured for high availability, dynamic load balancing, and horizontal scaling. In some examples, the agents can use loopback interfaces (e.g., that provide state full protocol reliable connection during network failures, automatic load-balance, form trusted connections, etc.). The wide area SDG can enable mDNS to operate across layer 3 boundaries (and enable zero-configuration over the wide area network). In some examples, an agent can send an advertisement to the controller, advertising services the devices (within the network the agent is connected) can provide to other networked devices across the wide area network (e.g., printing, file sharing, screen sharing, audio/video, etc.) Once connected, the agents and controller can keep an active connection (e.g., maintain the state), for example, until an agent sends a withdraw messages or a heartbeat is not received at the server from the agent. While connected, the advertised devices can be available for connection by other networked device based on one or more policies. For example, controller 250 can execute one or more policies (e.g., wide area controller policies, etc.) for enabling communication between the devices (e.g., 212, 222, 232, etc.) of the networks (e.g., 110, 120, 130, etc.) via the agents (e.g., 216, 226, 236). Agents (e.g., 216, 226, 236, etc.) can also run one or more policies (e.g., local area agent polices, wide area agent policies, etc.). In some examples, there can be more than one controller. In some examples, the controllers can run in an active/standby configuration. In some examples, the controller can be a distributed system, for example, multiple controllers can operate in a distributed fashion, however, the agents would perceive one controller.

The one or more devices (e.g., 212, 222, 232, etc.) can transmit query requests to the controller 250 via agents (e.g., 216, 226, 236) to discover available services. In some examples, the query request can be a network device requesting available services that are offered for connection (e.g., TV, casting, printing, etc.). In response, the controller can transmit (and the one or more devices can receive) query responses. The query responses can be received at the agent (which sent the query request on behalf of the device) and sent to the one or more devices in the network the agent services, as such, some query responses are solicited (e.g., sent to the device who transmitted the query request) and some query responses are unsolicited (e.g., sent to devices who did not transmit the query request). For example, device 222A can transmit a query request to controller 250 via agent 226. Controller 250 can transmit the available services back to agent 226 via a query response. Agent 226 can then transmit the query response to the one or more devices in network 120, including 222A (e.g., solicited), 222B (e.g., unsolicited) and 222C (e.g., unsolicited). At a time subsequent, redundant query requests and responses can be transmitted and received through the network, which can negatively impact network bandwidth and performance. The agents can be configured to suppress redundant query responses in the local networks (e.g., 110, 120, 130) and the redundant query requests in the wide area networks (e.g., 240). For example, each local network (e.g., 110, 120, 130) can include one or more subnets. During local network suppression, the agents can suppress query requests in each subnet of the local network individually of the other subnets in the local network. For example, Local Network 110 can have Subnet A and Subnet B. Subnet A and Subnet B can both send a query request including the same service request (e.g., tuple). The agent will not suppress either tuple, even if the tuple enters the suppression period for Subnet A before the tuple from Subnet B arrives. That is, the suppression of the tuples is on a per-tuple and per-subnet basis. During wide area network suppression, the agent can suppress the query requests for subnets of the local network. For example, Local Network 110 can have Subnet A and Subnet B. Subnet A and Subnet B can both send a query request including the same service request (e.g., tuple). While, as explained above these tuples will not be suppressed locally, the agent can suppress the tuple of the subnet that arrives at a later time. For example, when the tuple arrives from Subnet A at a first time, the tuple can enter the suppression period. When the tuple arrives from Subnet B at a second time (after the first time), the tuple can be suppressed and not sent to the controller (when the tuple is still in the suppression period).

Suppression can take place at on per tuple basis. For example, query requests can include one or more tuples describing the query request. In some examples, the tuples can include a service type, query network address IPv4, query network address IPV6, etc. Upon receiving, at an agent, a query request with a new tuple, for example, during the processing period the agent and transmit the query request to the controller and the agent can enter the suppression period for the received tuple. For example, Device 222A can transmit a query request to Agent 226 with the tuple of (1) service type—casting; (2) IPv4—X.X.X.X; and (3) IPv6—Y:Y:Y:Y:Y:Y:Y:Y. Agent 226 can transmit the query request to Controller 250 and enter a suppression period for the received tuple. Controller 250 can transmit query response back to Agent 226, which can in-turn transmit to the Devices 222 in Network 120. Subsequent query requests received at Agent 226, during the suppression period, with an equivalent tuple can be suppressed. Upon expiration of the suppression period and reestablishment of the processing period, the query request with the tuple can be processed (e.g., not suppressed), when received at Agent 226.

In some examples, the processing period can be initiated on a per tuple basis (e.g., each tuple can be independently suppressed or processed). For example, independent per-tuple and per-interface processing reduces significant amount of redundant query requests. In some examples, the processing period can be limited to packet counts depth and can be combined with processing timing window. For example, overflow packet count can be dropped and can be processed in next timing window when the networked device requests again. In some examples, the processing timing window is automatically initiated based on network event, for example, an interface becomes operational, service configuration applied, suppression technique enabled, etc.

In some examples, the suppression period can be initiated on a per tuple basis (within same local network), after a query request with the tuple has been received at an agent. For example, the suppression period can be a timing window where each incoming any query request is inspected and dropped if the same tuple was received in the predeceasing processing period (to which the suppression period was initiated). In some examples, the suppression period is an adjustable timing window. In some examples, the suppression period can define a "silent" period that automatically adjusts the processing period to efficiently handle incoming query requests.

The suppression period can operate in a standard mode or an aggressive mode. For example, in standard mode the suppression period could be a factor times the length of the processing period time (e.g., 2×, etc.). In some examples, the suppression period can be adjustable to provide more graceful behavior in network with consideration of operating systems running on mDNS receiver devices, user service browsing behavior, event-based etc. The standard mode can be very effective in high scale Bonjour network environments.

When operating in aggressive mode, for example, the suppression period can be similar in length as processing period. In some examples, in mid-to-low density networks with small tuple variable and low query message rate the suppression period can be adjusted to improve response time. In some examples, adjusting the suppression period in large-scale network environment could introduce adverse impacts to the network environment (e.g., by generating more redundant messages at higher frequency rate).

The method shown in FIG. 3 is provided by way of example, as there are a variety of ways to carry out the method. Additionally, while the example method is illustrated with a particular order of blocks, those of ordinary skill in the art will appreciate that FIG. 3 and the blocks shown therein can be executed in any order that accomplishes the technical advantages of the present disclosure and can include fewer or more blocks than illustrated.

Each block shown in FIG. 3 represents one or more processes, methods or subroutines, carried out in the example method. The blocks shown in FIG. 3 can be implemented in a network environment such as network environment 200 shown in FIG. 2. The flow chart illustrated in FIG. 3 will be described in relation to and make reference to at least the elements of network 200 shown in FIG. 2.

FIG. 3 shows a flow diagram of an example method 300 for suppressing redundant query requests in a local network. Method 300 can begin at block 302. At block 302, an agent (e.g., SDG 226) can receive an mDNS message (e.g., query request). Upon receipt of the mDNS message, the agent can determine the type of message. When it is determined the message is an announcement packet type (block 304), the message will be processed without suppression (block 306).

When it is determined the message is a query packet type (e.g., sent by a device operating as a receiver of services) (block 308), the agent can then determine the request type (e.g., unicast request or multicast request). When the agent determines the message is a unicast request (e.g., QU frame traffic) (block 310), the message will be processed without suppression (block 312). For example, unicast requests are not suppressed, as the unicast request is a single message requesting a unique response for the requested service.

When the agent determines the message is a multicast request (e.g., QM frame traffic) (block 314), the agent then determines the query message type. When the query message type is of type "any" (block 316), the message is processed without suppression (block 318). The "any" type of message can be received from a source (e.g., service provided) not a receiver (e.g., device looking to use a service), for example, used to determine if the proposed service name is already in use (e.g., name de-duplication).

When the query message type is of type "standard" or "standard and answer" (block 320), the message can continue to be processed with suppression. In some examples, a standard type message includes no additional information (e.g., no known records). In some examples, the standard and answer type message includes additional information (e.g., known records). The additional information can include information on previously received query responses. For example, information on offered services previously received can be, but is not limited to: IP address, service type, service name, etc. When this information is provided, to the controller (e.g., SDG), in a subsequent query request, the controller (e.g., SDG) can verify the information (e.g., known records), and if necessary update the information for transmission back to the networked devices. When the information is still correct (at the controller), the controller (e.g., SDG) can ignore including a response to that offered service (e.g., the networked device already has the correct information stored locally).

When the query message type has been determined as "standard" or "standard and answer" the agent can determine, for the tuple associated with the message, whether the tuple is in a processor period (block 322) or suppression period (block 332). When in suppression period (block 332), the message is suppressed (block 334). When the tuple is in processing period (block 322), the agent then determines whether the tuple is new (block 324) or duplicate (block 328). For example, when the tuple has been recently responded to by the agent (e.g., duplicate) the message can be suppressed (block 330). When the tuple has not recently been responded to, the message can be processed (block 326).

Referring now to FIG. 4, which illustrates three example tuples in the processing period of a local network. Local Network 400 can include Agent 226 configured to receive one or more tuples (e.g., 440) from one or more networked devices. In this example, Agent 226 receives Query Cast Tuple 440A, Query Printer Tuple 440B and Query TV 440C. Each tuple includes at least, a service type (e.g., Cast, Printer, TV, etc.), IPv4 and IPv6. Each tuple can be transmitted, to Agent 226, by one or more networked devices (e.g., PC1, PC2, PC3, PC4, etc.) in either IPv4 or IPV6. The transmission can be sent with a timestamp. In this example, PC1 442 (of IPv4) and PC3 444 (of IPv6) have the earliest timestamps and were first transmitted to Agent 226. PC1 (of IPv6) was delayed, so PC3 (of IPv6) had an earlier timestamp and was transmitted. When transmitted and received (by the agent) during the processing period, Agent 226 can respond to the query, for example, Response IPv4 446 and Response IPv6 448. Subsequent query requests of same tuple (e.g., IPv4: PC2, PC3, PC4, etc.; IPv6: PC5, PC4, PC1, etc.) can be suppressed as illustrated by the "X" (by method 300 of FIG. 3). While FIG. 4 illustrates an agent receiving tuples from networked devices on one local network, it is realized the agent can service networked devices from multiple independent local networks.

Referring now to FIG. 5, which illustrates three example tuples maintaining respective processing period and the suppression period of a local network. In some examples, the processing period and suppression periods are independent on a per tuple basis. Local Network 500 can include Agent 226 configured to receive one or more tuples (e.g., service type, IPv4, IPv6) from one or more networked devices (e.g., PC1, PC2, PC3, etc.). The processing and suppression periods can be on a per tuple basis. For example, tuple 550A can be in the processing period, tuple 550B can be in the suppression period and tuple 550C can be in the suppression period for IPv4 and can be in the processing period for IPv6. Tuple 550A is in the processing period where PC1 and PC3 have the earliest timestamps and are in process of sending a query to Agent 226. Tuple 550B is in the suppression period as shown by Query Response 554 of tuples PCX for IPv4 and IPv6 of Printer Service. Any further transmissions (e.g., from PC2, PC3, PC4, PC5, etc.) can be suppressed during the suppression period. Tuple 550C for TV Service has IPv4 in the suppression period shown by Query Response 558 of Tuple PCX and has IPv6 in processing period shown by PC3 556 with the earliest timestamp, to be transmitted to Agent 226. Subsequent queries can be suppressed illustrated by the "X" (by method 300 of FIG. 3).

The method shown in FIG. 6 is provided by way of example, as there are a variety of ways to carry out the method. Additionally, while the example method is illustrated with a particular order of blocks, those of ordinary skill in the art will appreciate that FIG. 6 and the blocks shown therein can be executed in any order that accomplishes the technical advantages of the present disclosure and can include fewer or more blocks than illustrated.

Each block shown in FIG. 6 represents one or more processes, methods or subroutines, carried out in the example method. The blocks shown in FIG. 6 can be implemented in a network environment such as network environment 200 shown in FIG. 2. The flow chart illustrated in FIG. 6 will be described in relation to and make reference to at least the elements of network 200 shown in FIG. 2.

FIG. 6 shows a flow diagram of an example method 300 for suppressing redundant query requests in a wide area network. Method 600 can be being at block 602. At block 602, an agent (e.g., SDG 226) can determine when to transmit a BCP (e.g., Bonjour Control Protocol) message (e.g., remote query request) to a controller (e.g., 250). Upon receipt of the mDNS message, the agent can determine the type of message. When it is determined the message is a service announcement packet type (block 604), the message can be added to the announcement queue to be transmitted to the controller without suppression (block 606). When it is determined the message is a service withdraw packet type (block 608), the message will added to the announcement queue to be transmitted to the controller without suppression (block 610).

When it is determined the message is a query packet type (e.g., sent by a device operating as a receiver of services) (block 612), the agent can verify the wide area agent policy. There can be at least three types of policies implemented in wide area zero configuration networking: local area agent policy, wide area agent policy and wide area controller policy. The local area agent policy can be enforced on the agent (e.g., gateway running agent) between the devices in the local network. The enforcement is in the layer 2 network domain and can be bi-directional. The local area agent policies can be enforced towards mDNS end-points in Layer 2 network domain. The local area agent policies can determine whether to permit or deny announcement and cache the service for further distribution. Similarly it can determines whether to listen request from another end-point to provide response. If permitted then an agent response can be based on local cache (e.g., at the agent). If denied, then the request can be denied. The wide area agent policy can be enforced on the agent for export control to the controller. The wide area agent policy can be uni-directional (egress) from the agent to the controller. This uni-directional policy is outbound towards the controller (e.g., central wide area bonjour naming server). The wide area agent policies can determine what locally discovered services are permitted/deny to be globally distributed thru the controller and what service request from local clients can be discovered from wide area network (e.g., wide area service SDG, Bonjour domain, etc.). The wide area controller policy can be enforced on the controller. The wide area controller policy can be enabled for global discovery and distribution to the agents and can be bi-directional.

When the agent determines the policy fails (e.g., the network device does not have permission to query controller) (block 614), the message will be dropped (block 616).

When the agent determines the policy passes (block 618), the agent can then determined a status of the query bucket (e.g., queue of number of packets that can be sent from the agent to the controller). When the query bucket is full (block 620), the query message can be stored in the next queue (block 622). When the query bucket is available, (block 624), the agent can determine if the tuple associated with the message is in the processing period or in the suppression period. When it is determined the tuple is in the suppression at block 636, the message can be suppressed at block 638.

When the tuple is in processing period (block 626), the agent can determine whether the tuple is new (block 628) or duplicate (block 632). For example, when the tuple has been recently responded to by the agent (e.g., duplicate) the message can be suppressed (block 634). When the tuple has not recently been remotely queried to, the message can be transmitted to the controller (block 630).

Referring to FIG. 7, which illustrates wide area network suppression 700. The wide area network suppression can determine the number of received queries at the agent, from one or more networked devices, to be transmitted to the controller for processing. For example, Agent 226 can receive from a networked device (e.g., 212, 222, 232, etc.) Un-Suppressed Query Request 772 of Tuples 770 for variety of services (i.e. Cast, Printer, TV) over the local network. Agent 226 can suppress one or more Un-Suppressed Query Requests 772 over the wide area network to Controller 250, for example, by Method 600. Suppressed Query Request 774 can be transmitted to Controller 250. Controller 250 can then retrieve the requested information (e.g., available services) and transmit Query Response 776 to Agent 226. Agent 226 can then transmit Query Request 778 back to the networked devices (e.g., 212, 222, 232, etc.).

The disclosure now turns to the example network device and system illustrated in FIGS. 8 and 9.

FIG. 8 illustrates an example network device 800 suitable for routing, switching, forwarding, traffic management, and load balancing. Network device 800 can be, for example, a router, a switch, a controller, a server, a gateway, and/or any other L2 and/or L3 device.

Network device 800 can include a master central processing unit (CPU) 804, interfaces 802, and a bus 810 (e.g., a PCI bus). When acting under the control of appropriate software or firmware, the CPU 804 is responsible for executing packet management, error detection, load balancing operations, and/or routing functions. The CPU 804 can accomplish all these functions under the control of software including an operating system and any appropriate applications software. CPU 804 may include one or more processors 808, such as a processor from the Motorola family of microprocessors or the MIPS family of microprocessors. In an alternative embodiment, processor 808 is specially designed hardware for controlling the operations of network device 810. In a specific embodiment, a memory 806 (such as non-volatile RAM and/or ROM) also forms part of CPU 804. However, there are many different ways in which memory could be coupled to the system.

The interfaces 802 are typically provided as interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 9 shows an example of computing system 900 in which the components of the system are in communication with each other using connection 905. Connection 905 can be a physical connection via a bus, or a direct connection into processor 910, such as in a chipset or system-on-chip architecture. Connection 905 can also be a virtual connection, networked connection, or logical connection.

In some embodiments computing system 900 is a distributed system in which the functions described in this disclosure can be distributed within a datacenter, multiple datacenters, a peer network, throughout layers of a fog network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, read only memory (ROM) 920 or random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output, and also connect computing system 900 to other nodes in a network. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, battery backed random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
receiving a multi domain name service message, wherein the multi domain name service message includes a tuple of at least a service type, IPv4 address and IPv6 address;
determining whether the multi domain name service message is a query request;
in response to determining the multi domain name service message is the query request, determining whether the multi domain name service message passes a wide area query policy;
in response to determining the multi domain name service message passed the wide area query policy, determining whether a query bucket is available;
in response to determining the query bucket is available, determining whether the tuple is in a suppression period; and
in response to determining the tuple is in the suppression period, suppressing the multi domain name service message.

2. The method of claim 1, further comprising:
in response to determining the multi domain name service message failed the wide area query policy, dropping the multi domain name service message.

3. The method of claim 1, further comprising:
in response to determining the query bucket is full, storing the multi domain name service message in a queue.

4. The method of claim 1, further comprising:
in response to determining the tuple is in a processing period, determining whether the tuple is new a duplicate.

5. The method of claim 4, further comprising:
in response to determining the tuple is new, processing the multi domain name service message.

6. The method of claim 4, further comprising:
in response to determining the tuple is duplicate, suppressing the multi domain name service message.

7. A non-transitory computer readable media storing instructions, which when executed by at least one processor, causes the at least one processor to:
receive a multi domain name service message, wherein the multi domain name service message includes a tuple of at least a service type, IPv4 address and IPv6 address;
determine whether the multi domain name service message is a query request;
in response to determining the multi domain name service message is the query request, determine whether the multi domain name service message passes a wide area query policy;
in response to determining the multi domain name service message passed the wide area query policy, determine whether a query bucket is available;
in response to determining the query bucket is available, determine whether the tuple is in a suppression period; and
in response to determining the tuple is in the suppression period, suppress the multi domain name service message.

8. The non-transitory computer readable media of claim 7, further comprising instructions, which when executed by the at least one processor, cause the at least one processor to:
in response to determining the multi domain name service message failed the wide area query policy, drop the multi domain name service message.

9. The non-transitory computer readable media of claim 7, further comprising instructions, which when executed by the at least one processor, cause the at least one processor to:
in response to determining the query bucket is full, store the multi domain name service message in a queue.

10. The non-transitory computer readable media of claim 7, further comprising instructions, which when executed by the at least one processor, cause the at least one processor to:
in response to determining the tuple is in a processing period, determine whether the tuple is a new or duplicate.

11. The non-transitory computer readable media of claim 10, further comprising instructions, which when executed by the at least one processor, cause the at least one processor to:
in response to determining the tuple is new, process the multi domain name service message.

12. The non-transitory computer readable media of claim 10, further comprising instructions, which when executed by the at least one processor, cause the at least one processor to:
in response to determining the tuple is duplicate, suppress the multi domain name service message.

13. A system, comprising:
at least one memory storing instructions;
at least one processor configured to execute the instructions to cause the at least one processor to:
receive a multi domain name service message, wherein the multi domain name service message includes a tuple of at least a service type, IPv4 address and IPv6 address;
determine whether the multi domain name service message is a query request;
in response to determining the multi domain name service message is the query request, determine whether the multi domain name service message passes a wide area query policy;
in response to determining the multi domain name service message passed the wide area query policy, determine whether a query bucket is available;
in response to determining the query bucket is available, determine whether the tuple is in a suppression period; and
in response to determining the tuple is in the suppression period, suppress the multi domain name service message.

14. The system of claim 13, further comprising instructions, which when executed by the at least one processor, cause the at least one processor to:
in response to determining the multi domain name service message failed the wide area query policy, drop the multi domain name service message.

15. The system of claim 13, further comprising instructions, which when executed by the at least one processor, cause the at least one processor to:
in response to determining the query bucket is full, store the multi domain name service message in a queue.

16. The system of claim 13, further comprising instructions, which when executed by the at least one processor, cause the at least one processor to:
in response to determining the tuple is in a processing period, determine whether the tuple is a new or duplicate.

17. The system of claim 16, further comprising instructions, which when executed by the at least one processor, cause the at least one processor to:

in response to determining the tuple is new, process the multi domain name service message.

18. The system of claim 16, further comprising instructions, which when executed by the at least one processor, cause the at least one processor to:
in response to determining the tuple is duplicate, suppress the multi domain name service message.

\* \* \* \* \*